United States Patent
Raghavan et al.

(10) Patent No.: US 10,127,261 B2
(45) Date of Patent: Nov. 13, 2018

(54) METHODS AND SYSTEMS FOR RESOLVING CONFLICTS IN HIERARCHICALLY-REFERENCED DATA

(71) Applicants: Mahesh Raghavan, Denville, NJ (US); Lawrence Steven Bach, Chester, NH (US); Dana Rigg, Austin, TX (US); Peter Elliott Haynes, Costa Mesa, CA (US)

(72) Inventors: Mahesh Raghavan, Denville, NJ (US); Lawrence Steven Bach, Chester, NH (US); Dana Rigg, Austin, TX (US); Peter Elliott Haynes, Costa Mesa, CA (US)

(73) Assignee: Dassault Systems Enovia Corporation, Waltham, MA (US)

( * ) Notice: Subject to any disclaimer, the term of this patent is extended or adjusted under 35 U.S.C. 154(b) by 578 days.

(21) Appl. No.: 14/145,004

(22) Filed: Dec. 31, 2013

(65) Prior Publication Data
US 2015/0186449 A1    Jul. 2, 2015

(51) Int. Cl.
*G06F 17/30* (2006.01)
*G06F 9/445* (2018.01)
*G06F 9/448* (2018.01)
*G06F 8/71* (2018.01)
*G06F 17/22* (2006.01)
*G06F 8/36* (2018.01)

(52) U.S. Cl.
CPC ...... *G06F 17/30371* (2013.01); *G06F 9/4488* (2018.02); *G06F 9/44552* (2013.01); *G06F 8/36* (2013.01); *G06F 8/71* (2013.01); *G06F 17/2288* (2013.01)

(58) Field of Classification Search
None
See application file for complete search history.

(56) References Cited

U.S. PATENT DOCUMENTS

| 5,499,365 | A | 3/1996 | Anderson et al. |
| 6,185,734 | B1 * | 2/2001 | Saboff ............ G06F 8/67 707/999.202 |
| 8,521,736 | B2 | 8/2013 | Rigg et al. |

(Continued)

OTHER PUBLICATIONS

EPO Extended Search Report and Patentability Opinion for related matter EP14004289 dated Apr. 29, 2015; 8 pp.

*Primary Examiner* — Aleksandr Kerzhner
*Assistant Examiner* — Eddy Cheung
(74) *Attorney, Agent, or Firm* — Armstrong Teasdale LLP

(57) ABSTRACT

In one aspect, a computer-implemented method for managing conflicts in a logical component hierarchy is provided. The logical component hierarchy includes an ancestor component and a descendant component associated with the ancestor component. The method uses a computer device in communication with a memory. The method includes determining, by the computer device, a requirement to replace the descendant component, within the logical component hierarchy, with an overriding component. The overriding component is associated with the ancestor component by an overriding reference. The method also includes replacing the descendant component with the overriding component within the logical component hierarchy.

17 Claims, 9 Drawing Sheets

(56) References Cited

U.S. PATENT DOCUMENTS

| | | | |
|---|---|---|---|
| 2006/0206866 A1* | 9/2006 | Eldrige | G05B 15/02 717/122 |
| 2007/0106708 A1* | 5/2007 | Rigg | G06F 8/71 |
| 2010/0125839 A1* | 5/2010 | Gebis | G06F 9/44536 717/170 |
| 2010/0223593 A1* | 9/2010 | Eldridge | G05B 15/02 717/105 |
| 2013/0297657 A1* | 11/2013 | Chinchwadkar | G06F 17/30961 707/797 |

* cited by examiner

METHODS AND SYSTEMS FOR RESOLVING CONFLICTS IN HIERARCHICALLY-REFERENCED DATA

BACKGROUND OF THE DISCLOSURE

This disclosure relates generally to managing hierarchies of components and, more particularly, to using overriding references to replace sub-components within a hierarchy of components.

When designing and developing large integrated systems, circuits in particular, typically no one team of engineers is responsible for the entire design of the system. Instead, often teams of engineers are responsible for designs of components of the system, the overall design being the totality of the designs of the components provided by each team of engineers. As the system becomes more complex, more and more aspects of the system are divided into sub-components. A parent component may be broken up into multiple sub-components. This arrangement of components and sub-components may be related in a hierarchy that represents the overall system.

Some developers and designers may build reusable components that enable reductions in design and implementation times of a component hierarchy. Some hierarchy management systems use hierarchical references ("hrefs") to link a component to a reusable component. As a component hierarchy becomes more complex, the probability of a conflict between reusable components increases. Such a conflict may be caused because, for example, the same reusable component is referenced by multiple components within a product, but they may reference different versions.

BRIEF DESCRIPTION OF THE DISCLOSURE

In one aspect, a computer-implemented method for managing conflicts in a logical component hierarchy is provided. The logical component hierarchy includes an ancestor component and a descendant component associated with the ancestor component. The method uses a computer device in communication with a memory. The method includes determining, by the computer device, a requirement to replace the descendant component, within the logical component hierarchy, with an overriding component. The overriding component is associated with the ancestor component by an overriding reference. The method also includes replacing the descendant component with the overriding component within the logical component hierarchy.

In another aspect, a computing device for managing conflicts in a logical component hierarchy is provided. The logical component hierarchy includes an ancestor component and a descendant component associated with the ancestor component. The computer device includes a processor communicatively coupled to a memory. The memory includes the logical component hierarchy. The computing device is programmed to determine a requirement to replace the descendant component, within the logical component hierarchy, with an overriding component. The overriding component is associated with the ancestor component by an overriding reference. The computing device is also programmed to replace the descendant component with the overriding component within the logical component hierarchy.

In yet another aspect, at least one non-transitory computer-readable storage media having computer-executable instructions embodied thereon is provided. When executed by at least one processor, the computer-executable instructions cause the processor to determine a requirement to replace a descendant component, within a logical component hierarchy, with an overriding component. The overriding component is associated with an ancestor component of the descendent component by an overriding reference. The computer-executable instructions also cause the processor to replace the descendant component with the overriding component within the logical component hierarchy.

BRIEF DESCRIPTION OF THE DRAWINGS

FIGS. 1-10 show exemplary embodiments of the methods and systems described herein.

FIG. 1 is a block diagram of an exemplary hierarchy of components.

FIG. 2 is a block diagram of versioned modules associated with the hierarchy of components shown in FIG. 1.

FIG. 3 is a snapshot of the versioned modules shown in FIG. 2 at a first time.

FIG. 4 is a snapshot of the contents of the versioned modules shown in FIG. 2 at a second time.

FIG. 5 is a block diagram of an exemplary hierarchy of components that includes overriding references.

FIG. 6 is a block diagram of another exemplary hierarchy of components that includes overriding references.

FIG. 7 is a flowchart illustrating an exemplary hierarchy load process that identifies and integrates overriding references.

FIG. 8 is a block diagram of an exemplary hierarchy management system configured to implement overriding references within the hierarchy of components shown in FIGS. 5 and 6.

FIG. 9 is a block diagram of a database within a computing device, along with other related computing components, that may be used to manage the hierarchy of components shown in FIGS. 5 and 6.

DETAILED DESCRIPTION OF THE DISCLOSURE

Figure 1:
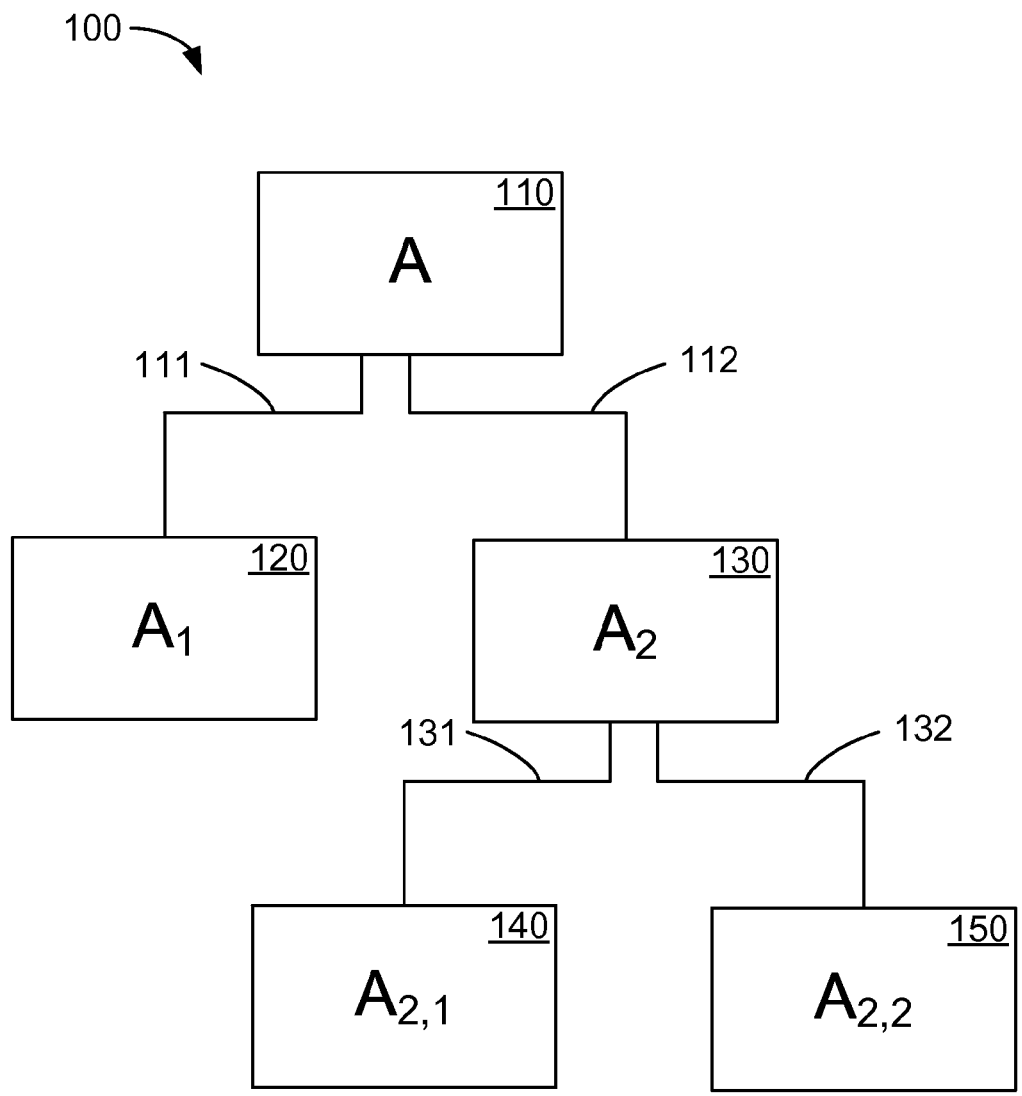

The following detailed description illustrates embodiments of the disclosure by way of example and not by way of limitation. It is contemplated that the disclosure has general application to managing hierarchies of components.

As used herein, an element or step recited in the singular and proceeded with the word "a" or "an" should be understood as not excluding plural elements or steps, unless such exclusion is explicitly recited. Furthermore, references to "exemplary embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The development of hardware or software systems that include a plurality of components may be made more efficient when the design of the system is divided into smaller and more manageable designs of components of the system. The design of the system may be further improved by a hierarchical representation in which overriding references may be added and used to replace sub-components with other versions.

FIG. 1 is a hierarchical representation 100 of an exemplary product A 110. The product A 110 includes a first component $A_1$ 120 and a second component $A_2$ 130. The second component $A_2$ 130 includes two sub-components $A_{2,1}$ 140 and $A_{2,2}$ 150. The product A 110 has hierarchical associations 111 and 112 with components $A_1$ 120 and $A_2$ 130, respectively. Likewise, the component $A_2$ 130 has hierarchical associations 131 and 132 with sub-components $A_{2,1}$ 140 and $A_{2,2}$ 150, respectively. The product A 110 may include further components (not shown), which may, in turn, include further sub-components. Sub-components may also include further sub-components and so forth.

Hierarchical representations, such as 100, may also be formulated separately for components or sub-components of the product A 110 (e.g., representations that are subsets of the complete hierarchical representations 100 of the product A 110). In addition, while in this embodiment the element A 110 is a product, the element A 110 may also be considered as a component, wherein the element $A_1$ 120 and the element $A_2$ 130 may be considered as sub-components of the element A 110. Likewise, the element $A_{2,1}$ 140 and the element $A_{2,2}$ 150 may be considered as components, with hierarchical relationships to their sub-components (not shown).

The product A 110 may be representative of any hardware or software system that may be designed in a modular fashion. For example, the product A 110 may be a car, wherein the component $A_1$ 120 may be the frame and the component $A_2$ 130 may be the engine of the car. The sub-components $A_{2,1}$ 140 and $A_{2,2}$ 150 of the engine may be, for example, a crank shaft and a cylinder, respectively, of the engine. In another example, the product A 110 may be an integrated circuit (IC) chip, wherein the component $A_1$ 120 may be the random access memory (RAM) and the component $A_2$ 130 may be the computer processing unit (CPU) of the IC chip. The sub components $A_{2,1}$ 140 and $A_{2,2}$ 150 of the CPU may be, for example, an arithmetic logic unit (ALU) and a control unit, respectively, of the CPU.

During the development process, a design team for a particular component may have access to all current and prior designs of the component and/or sub-components of the component. A design team may be responsible for a component at any level on the hierarchical representation 100. For example, a design team may exist for development of the product A 110, as well as separate design teams for each of the product A's 110 components (e.g., the components $A_1$ 120 and $A_2$ 130). The design team for the product A 110 may be responsible for simulating and/or testing the product A 110 using particular designs of the components of product A 110.

Designs for the product A 110 and all of its components, $A_1$ 120 and $A_2$ 130, and sub-components, $A_{2,1}$ 140 and $A_{2,2}$ 150, may be included as files in modules that are stored in a central database or a distributed database (not shown in FIG. 1) for retrieval by any of the design teams. A module typically includes one or more files including software code and/or design data. Modules may contain other modules and they may be released and even packaged for re-use. In some implementations, a server-side database is used, such as, for example, a business objects database from Dassault Systèmes ENOVIA Corp. of Waltham, Mass. However, any other databases or combinations of databases that enable the operation of the systems and methods described herein may be used.

To help facilitate and track the development of a component, each design of the component, which is stored in a module, may have a specific version number associated with that module, e.g., a module and/or a component version.

Figure 2:
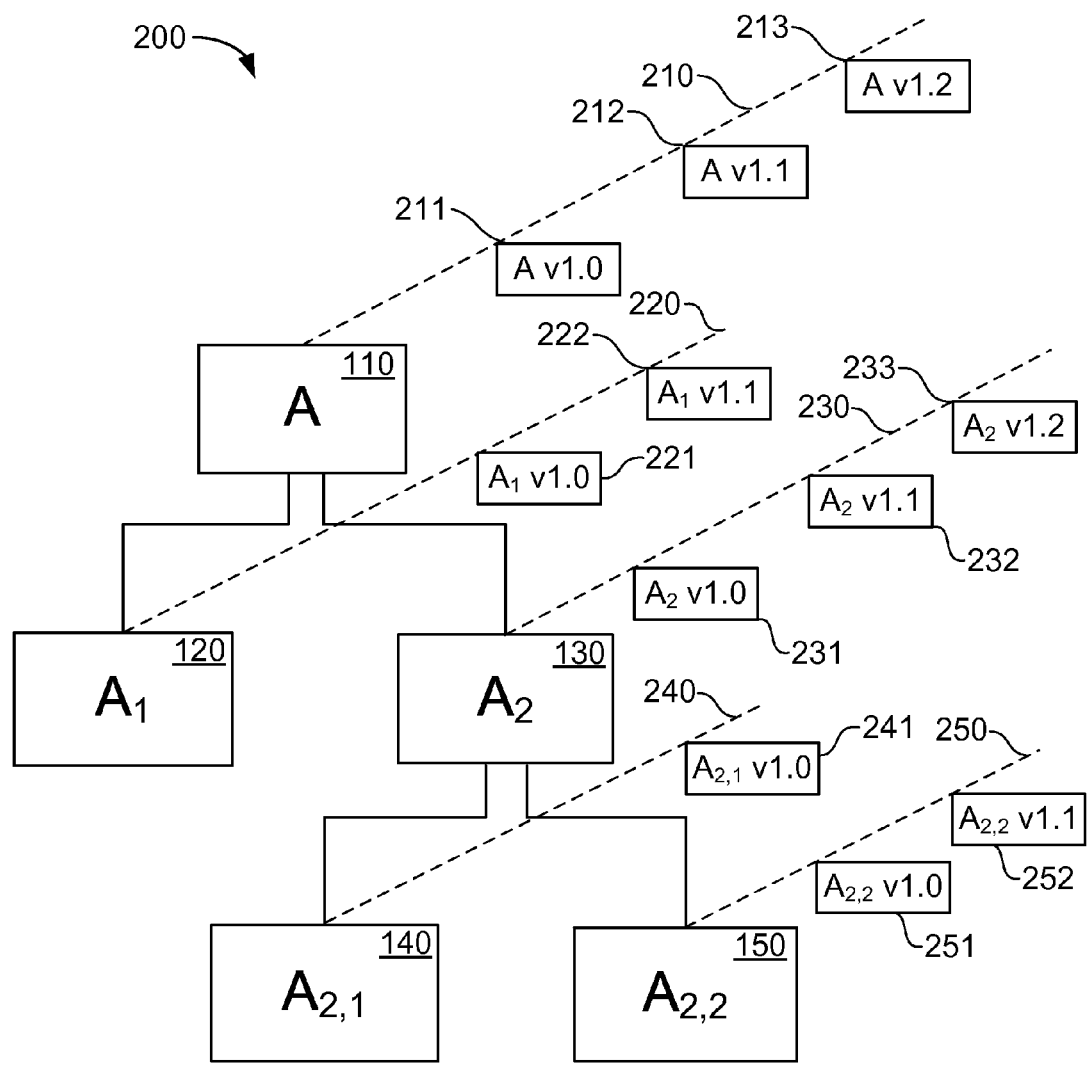

FIG. 2 illustrates a block diagram 200 of versioned modules associated with specific components, using the same hierarchy of components as illustrated in FIG. 1. The product A 110 may be associated with multiple modules with different module version numbers, e.g., modules A v1.0 211, A v1.1 212, and A v1.2 213.

The diagram 200 includes module branches 210, 220, 230, 240, and 250. A module branch represents the chronological progression of updates to a collection of objects that have a common association with a particular product, component, or sub-component. For example, the collection of modules A v1.0 211, A v1.1 212, and A v1.2 213 included or referenced by the module branch 210 are different versioned modules of the product A 110 that each represent a subsequent update or change to the antecedent versioned module. As used herein, modules sharing a common module branch may be referred to as "the same module," e.g., indicating that they are either the same or different versions of a common underlying module version lineage. Similarly, elements or components may also be referred to as "the same" if they share a common underlying version lineage, such as branches 210, 220, 230, 240, and 250. The module branch 220 refers to the collection of modules $A_1$ v1.0 221, and $A_1$ v1.1 222 that are different versioned modules associated with the component $A_1$ 120. The module branch 230 refers to the collection of modules $A_2$ v1.0 231, $A_2$ v1.1 232, and $A_2$ v1.2 233 that are different versioned modules associated with the component $A_2$ 130. The module branch 240 refers to the collection of module $A_{2,1}$ v1.0 241 associated with the sub-component $A_{2,1}$ 140. The module branch 250 refers to the collection of modules $A_{2,2}$ v1.0 251, and $A_{2,2}$ v1.1 252 that are different versioned modules associated with the sub-component $A_{2,2}$ 150.

A versioned module (e.g., the modules A v1.0 211, A v1.1 212, and A v1.2 213) conveys that the module was updated or changed at a specific point in time of a chronological progression of updates or changes to the design of the component (e.g., the product A 110). Any change to a component design from one module by one of the design teams can result in the creation of a new module with a new module version number. For example, the design team for the component $A_2$ 130 makes a change to the design of version 1.1 included in module $A_2$ v1.1 232 and creates module $A_2$ v1.2 233 with new version number 1.2 to save the new design. A particular component (e.g., the component $A_2$ 130) can have multiple design versions, each stored in separate modules (e.g., the modules $A_2$ v1.0 231, $A_2$ v1.1 232, and $A_2$ v1.2 233) with different version numbers (e.g., v1.0, v1.1, and v1.2).

Figure 3:
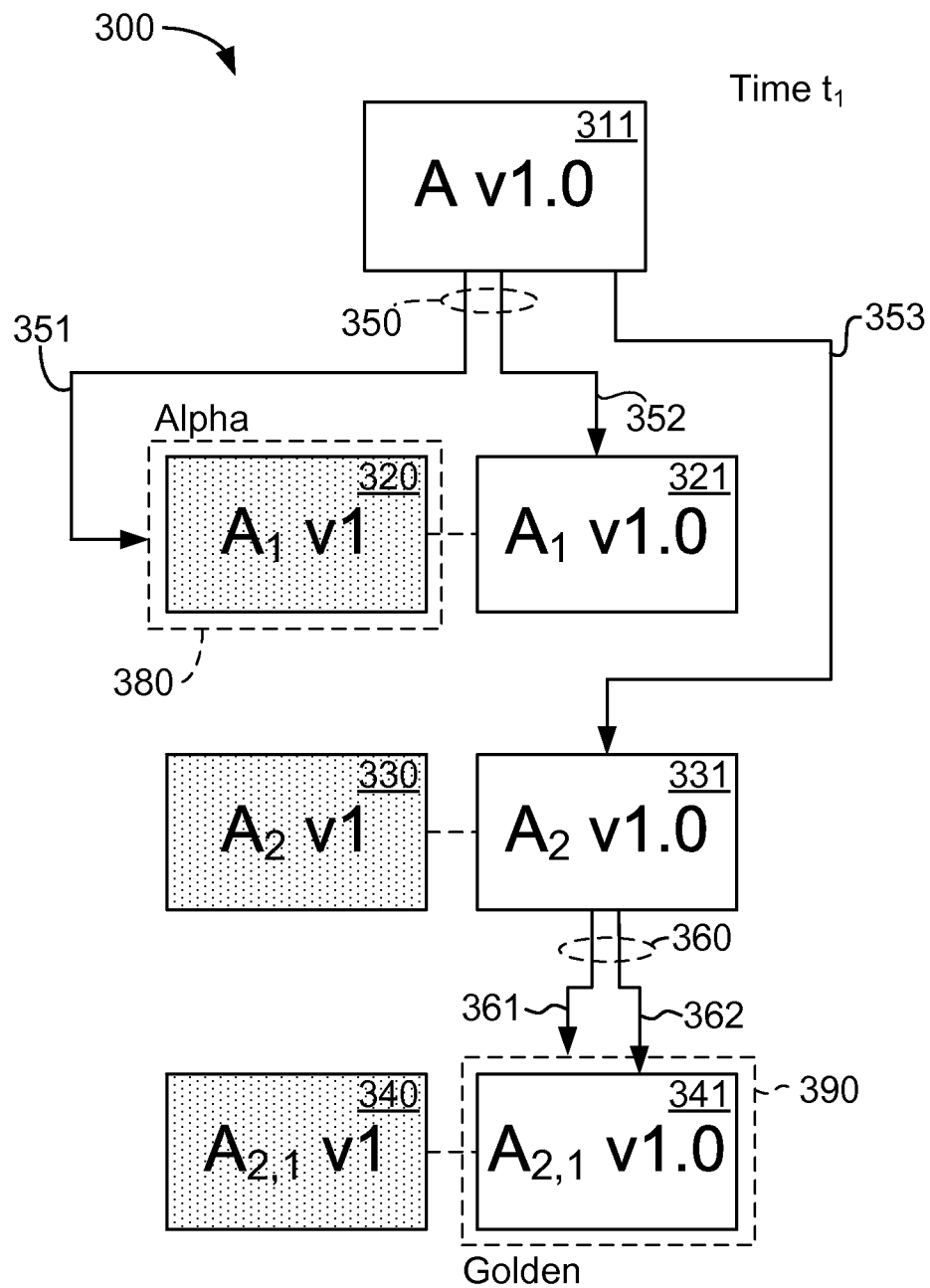
Figure 4:
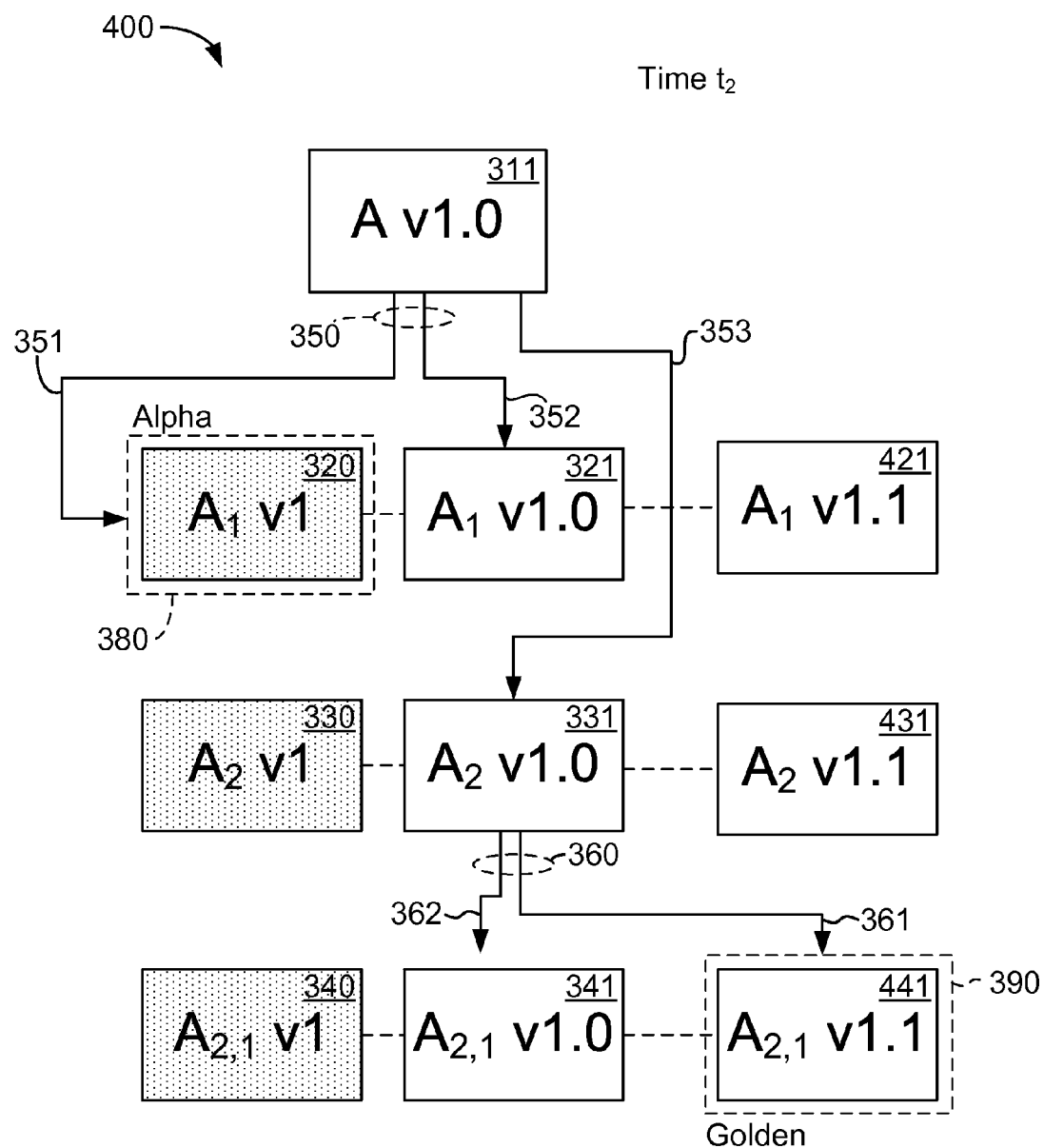

To further facilitate the development of a product or component, one or more hierarchical references may be stored in a component's modules that refer to particular sub-modules. FIGS. 3 and 4 illustrate examples of the different types of hierarchical references that may exist and change from time $t_1$ to $t_2$ between the module of a particular design of a product and the sub-modules associated with components of that product. FIGS. 3 and 4 use a portion of the hierarchical representation 100, wherein the product A 110 includes the two components, $A_1$ 120 and $A_2$ 130, and the component $A_2$ includes one sub-component $A_{2,1}$ 140. A sub-module may be any module that has been referenced by another module and associates with a sub-component of the component associated with the module. For example, in FIG. 3, modules $A_1$ v1.0 321 and $A_2$ v1.0 331 are sub-modules of the module A v1.0 311, and module $A_{2,1}$ v1.0 341 is a sub-module of the module $A_2$ v1.0 331. The module A v1.0 311 is associated with component A 110 and the sub-modules $A_1$ v1.0 321 and $A_2$ v1.0 331 are associated with sub-components $A_1$ 120 and $A_2$ 130, respectively.

FIG. 3 is an exemplary snapshot 300, at time $t_1$, of the contents of a database (not shown in FIG. 3) storing the modules for the product A 110 (shown in FIG. 2). The module A v1.0 311 includes version 1.0 of a design of the product A 110. Modules $A_1$ v1.0 321 and $A_2$ v1.0 331, respectively, include versions 1.0 of designs of the components $A_1$ 120 and $A_2$ 130 (both shown in FIG. 2). The module $A_{2,1}$ v1.0 341 includes version 1.0 of a design of the sub-component $A_{2,1}$ 140 (shown in FIG. 2). A module branch 320 refers to the chronological progression of the modules associated with the component $A_1$ 120 and includes or refers to, at time $t_1$, the module $A_1$ v1.0 321. A module branch 330 refers to the chronological progression of the modules for the component $A_2$ 130 and includes or refers to, at time $t_1$, the module $A_2$ v1.0 331. A module branch 340 refers to the chronological progression of the modules for the sub-component $A_{2,1}$ 140 and includes or refers to, at time $t_1$, the module $A_{2,1}$ v1.0 341.

Time $t_1$ may be, for example, the time at which the design team for the product A 110 first transfers the module A v1.0 311 to the database. The module A v1.0 311 includes the first design of the product A 110, which is assigned version number 1.0. The design team at or before this time defines a dynamic hierarchical reference 351 to the "alpha" tag 380 and a static hierarchical reference 353 to the module $A_2$ v1.0 331.

In the example of FIG. 3, a static hierarchical reference 352 is created that points to the module $A_1$ v1.0 321, which, as described below, is the module that the "alpha" tag 380 refers to at time $t_1$. Therefore, initially the hierarchical references 351 and 352, grouped as 350, both refer to the same module though they point to different objects. By automatically defining a static hierarchical reference at the time a dynamic hierarchical reference is created, a design team in the future can advantageously use this static hierarchical reference for determining the initial association of the dynamic hierarchical reference, even when the dynamic hierarchical reference points to subsequent versioned modules.

In a similar fashion, a dynamic hierarchical reference 361 for the module $A_2$ v1.0 331 is created by the design team for the component $A_2$ at or before the time this design team transfers or commits the module $A_2$ v1.0 331 to the database. In this example, the design team for the component $A_2$ defines the dynamic hierarchical reference 361 to point to the "golden" tag 390. The golden tag 390 initially points to module $A_{2,1}$ v1.0 341. A static hierarchical reference 362 is automatically defined, at process 550, to point to the same module that the dynamic hierarchical reference 361 initially points to, which is module $A_{2,1}$ v1.0 341. Initially, the hierarchical references 361 and 362, grouped as 360, both refer to the same module though they point to different objects.

In the illustrated example of FIG. 3, hierarchical references for a module associated with a component are created at the time the module is committed to the database. However, hierarchical references stored in a module may be added, deleted, or changed at any time after the module has been committed.

FIG. 4 is a snapshot 400, at a later time $t_2$, of the contents of the database (not shown in FIG. 4) storing the modules for the product A 110 (shown in FIG. 2). At a time between $t_1$ and $t_2$, the design teams for the components $A_1$ 120, $A_2$ 130, and $A_{2,1}$ 140, respectively, transfer new modules $A_1$ v1.1 421, $A_2$ v1.1 431, and $A_{2,1}$ v1.1 441. In addition, the design team for the component $A_{2,1}$ 140 moves the "golden" tag 390 from the module $A_{2,1}$ v1.0 341 to the module $A_{2,1}$ v1.1 441.

Generally, hierarchical references can be dynamic or static. A static hierarchical reference (e.g., hierarchical references 352, 353, and 362) refers to a module including a particular version of a component or sub-component. For example, the static hierarchical reference 352 refers to module $A_1$ v1.0 321, which includes version 1.0 of the design of component $A_1$ 120. On the other hand, a dynamic hierarchical reference (e.g., hierarchical references 351 and 361) can refer to a tag or to a module branch, which then refers to a particular module. Tags and module branches may change, thus the module that the dynamic hierarchical reference ultimately refers to can change. A tag may be manually changed by a user to refer to a different module. For example, the design team for the component $A_{2,1}$ 140 moves the "Golden" tag 390 from the module $A_{2,1}$ v1.0 341 to the module $A_{2,1}$ v1.1 441. A module branch may be changed by adding a new module (e.g., a new module version) to the module branch. For example, when the design team for component $A_1$ 120 transfers the new module $A_1$ v1.1 421 to the database, the module branch 320 changes such that it additionally includes or refers to the new module $A_1$ v1.1 421 (e.g., the module branch points to the latest version).

Tags of different types can be defined. For example, the most recent module of any component can be associated with an "alpha" tag, which may represent an "in-process" version of the component. In the example illustrated in FIG. 3, by defining an "alpha" tag 380 to refer to the branch 320, the "alpha" tag 380 refers to the module with the most recent version that the module branch 320 refers to or includes. In an alternative embodiment, the dynamic hierarchical reference 351 may point to the module branch 320 directly and the same result would apply. In another example (not illustrated), a module of a component may be tagged as "beta," which may represent a "testing" version of the component. A module of a component may also be tagged as "golden," which may represent the latest "stable" version of the component. In the example illustrated in FIG. 3, the design team for the component $A_{2,1}$ 140 initially defines version 1.0 of the component $A_{2,1}$ 140 as the "golden" version. Each of the "alpha", "beta", and "golden" tags are dynamic, because they are changeable (e.g., a design group may change the tag to point to a different versioned module) and thus do not always refer to the same module over time.

Figure 5:
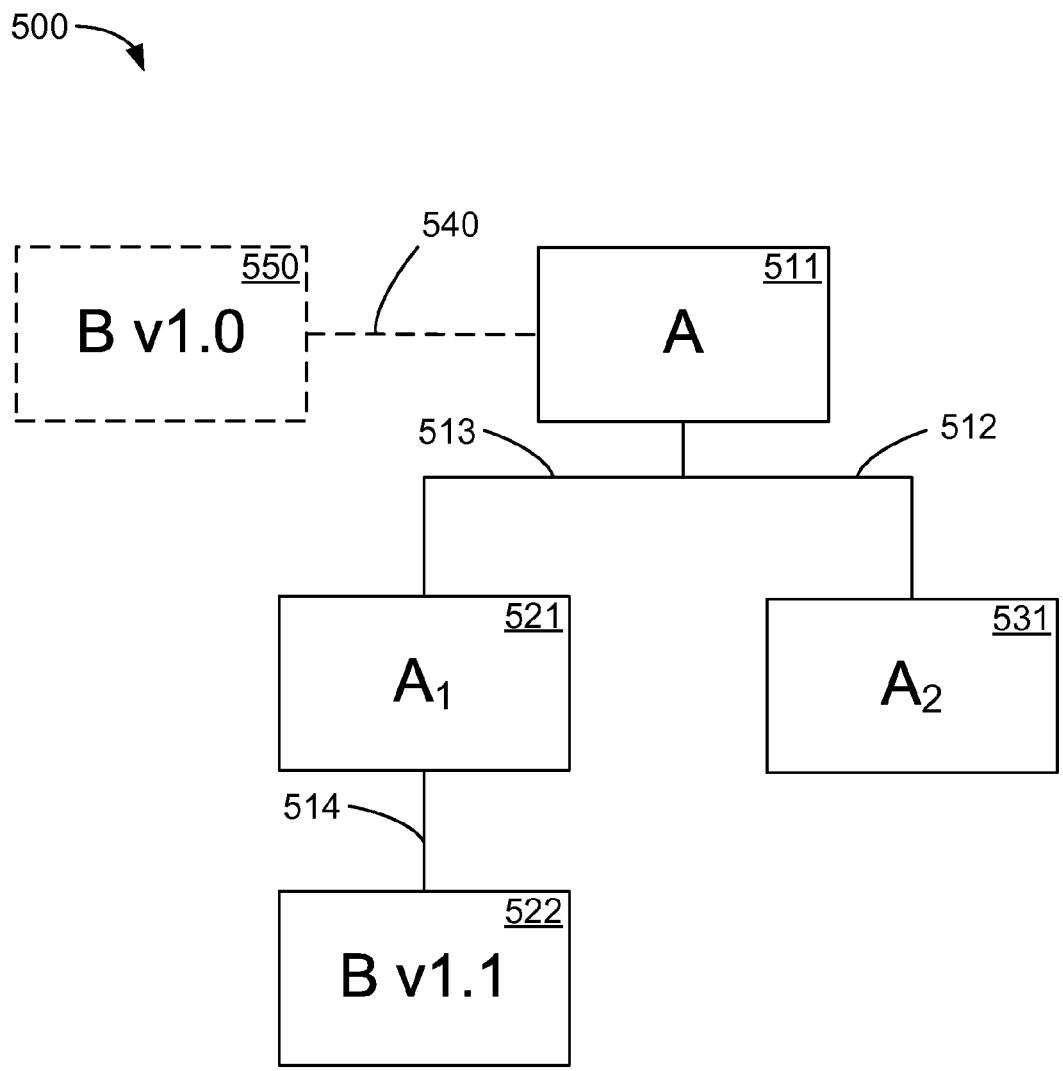

FIG. 5 is a hierarchical representation 500 of an exemplary product A 511 that includes overriding references. The product A 511 includes a first component $A_1$ 521 and a second component $A_2$ 531. Product A 511 may be similar to the product A 110 (shown in FIGS. 1 and 2), or to Product A v1.0311 (shown in FIGS. 3 and 4), and components $A_1$ 521 and $A_2$ 531 may be similar to products $A_1$ 120 and $A_2$ 130 (shown in FIGS. 1 and 2) or $A_1$ v1.0 321 and $A_2$ v1.0 331 (shown in FIGS. 3 and 4). The first component $A_1$ 521 includes one sub-component B v1.1 522. The product A 511 has hierarchical associations 512 and 513 with components $A_1$ 521 and $A_2$ 531, respectively. Likewise, the component $A_1$ 521 has a hierarchical association 514 with sub-component B v1.1 522. It should be understood that while each component in hierarchy 500 may include a version identifier such as a version number, version numbers for components A 511, $A_1$ 521, and $A_2$ 531 have been excluded for purposes of focus and readability.

The terms "descendent," "ancestor", "parent," and "child" as used herein, refer to logically-familial, hierarchical relationships between components (e.g., a tree structure of components). For example, component B v1.1 522 may be referred to as a descendent of its ancestors, $A_1$ 521 and A 511. Component $A_1$ 521 is the parent of component B v1.1 522 (i.e., the first adjoining, immediate ancestor) and, likewise, component B v1.1 522 is the child of component $A_1$ 521. Further, component $A_1$ 521 is itself the descendent (in this case, a child) of component A 511 (i.e., its parent). As such, these terms may be used for convenience to define and describe these logical relationships between components.

In the exemplary embodiment, product A 511 includes a reference 540 to an overriding component B 550. Overriding reference 540 is used as an indicator to replace any matching components with the overriding component B 550. In other words, the presence of the overriding reference 540 within the component A 511 (i.e., an ancestor components of $A_1$ 521, $A_2$ 531, and B v1.1 522) causes the system to replace, within any of its progeny, any references to other instances of the component B below itself in the hierarchy 500, as described in greater detail below.

Reference 540, in the exemplary embodiment, is not a hierarchical associate 514 like associations 512, 513, and 514, but rather is used, and referred to herein, as an overriding reference 540. Overriding component B 550 includes a version 1.0 which, in the example shown in FIG. 5, is different than the version shown for component B v1.1 522 (i.e., version 1.1). In the exemplary embodiment, overriding component B 550 has no familial relationship to component A 511 (i.e., component B 550 is not a direct member of the hierarchy), and thus overriding reference 540 does not describe a familial relationship. Rather, overriding reference 540 is a link to another component, or in some embodiments a specific version of a component, whose use is described in greater detail below.

During operation, a computing system (not shown in FIG. 5) responsible for reading and building hierarchical representations of products and/or components, such as hierarchical representation 500 of product A 511 within a computer-aided drafting system, loads component modules into data structures within a working memory (not shown in FIG. 5) of the system. In some embodiments, some sub-components may be stored in a separate module (e.g., component A 511 may be in one module and refer to a sub-component $A_1$ 521 that is stored in a different module). In other embodiments, some sub-components may be stored within the same module (e.g., component A 511 and sub-component $A_1$ 521 may be stored in the same module). In the exemplary embodiment, each component A 511, $A_1$ 521, $A_2$ 531, and B v1.1 522 are stored in separate modules.

In the exemplary embodiment, the system starts by loading a module associated with component A 511. The module associated with component A 511 identifies that component A 511 includes two children components, $A_1$ 521 and $A_2$ 531, as well as an attached overriding reference 540 to overriding component 550. The system then examines and/or imports the module associated with $A_1$ 521. While examining the module for component $A_1$ 521, the system notices the presence of a sub-component B v1.1 522 (i.e., a child component of $A_1$ 521 as defined within the module associated with $A_1$ 521).

In some known systems, the sub-component would be immediately processed (i.e., the data structure of the child component B v1.1 522 would be immediately loaded into the hierarchy based on the hierarchical reference of the parent component $A_1$ 521). In the exemplary embodiment, however, before loading sub-component B v1.1 522, the system checks for the presence of any overriding components for component B. More specifically, the system checks one or more of the ancestors of sub-component B v1.1 522 for the presence of an overriding reference for component B, such as overriding reference 540. The presence of an overriding reference for component B indicates to the system that the overriding component 550 (i.e., the component referenced by overriding reference 540) is to be used instead of the component (e.g., component B v1.1 522) expressly referenced by the parent (e.g., component $A_1$ 521). As such, rather than loading the module associated with component B v1.1 522 (i.e., version 1.1 of component B), the system suppresses the component B v1.1 522 reference (i.e., reference 514) and instead loads the overriding component 550 referenced by overriding reference 540 (e.g., version 1.0 of component B). Further, in some embodiments, the data structure for component $A_1$ 521 (i.e., the parent component of the sub-component being overridden) is marked such that reference 514 is indicated as being overridden. This overridden reference 514 is not processed, nor will it participate further in the design.

In this exemplary embodiment, the overriding reference 540 preempts the loading of sub-components of a particular type of component, and uses the specified overriding component. In other words, overriding reference 540 is used only when the sub-component matches the overriding component but has differing versions (i.e., they share a common component version lineage, similar to branches 210, 220, 230, 240, and 250, but call for different versions). In some embodiments, every distinct component has a unique URL, or other identifier that may be used to identify matches between components, or between a component and an overriding reference/component. In other words, for example, every version of component B shares a common URL, and no other component shares that same URL. As such, an overriding reference is a reference on the ancestor chain which has a matching URL. Accordingly, the overriding reference version preempts any differing versions of the overriding component found in the progeny of the ancestor to which the overriding reference is linked.

In some embodiments, multiple ancestors may have overriding components defined for the same component, such as component B. To resolve such situations, in some embodiments, the system starts with the parent of B v1.1 522 (i.e., $A_1$ 521) and looks up to each parent/ancestor of each component through the top of the tree (i.e., component A 511) is reached. In some embodiments, the first overriding reference found for component B is used. In the exemplary embodiment, the highest overriding reference found for component B (i.e., the reference from the most senior ancestor) is used.

Further, in other embodiments, the system performs such checks for overriding references for each component/sub-component prior to loading. In other words, in the example shown in FIG. 5, the system may check for overriding references when first loading component $A_1$ 521, and when loading component $A_2$ 531, and when loading component B v1.1 522. Accordingly, even higher-order components (i.e., components that have children) may be preempted by a higher ancestor.

Also, in some embodiments, a user defines the overriding reference 540 to the overriding component 550. In some embodiments, overriding reference 540 is a link or other reference to overriding component 550 stored in the module associated with component A 511. For example, the user may define an overriding reference 540 as a memory pointer to a data structure associated with overriding component 550, or the user may define the overriding reference 540 as an href to overriding component 550. In other embodiments, overriding reference 540 is a field in the data structure associated with an ancestor component (e.g., component A 511) that includes preemption identification criteria for determining whether and/or when overriding reference 540 and overriding reference 550 may be used to preempt a sub-component. For example, the ancestor component's data structures in memory, or module's file, may include field information defining an overriding reference to a "component B" with a version "v1.0". As such, overriding reference 540 may be identified by the presence of data in the memory field, and the overriding component 550 may be identified through use of the field data to access component modules using the component name and version identified in those fields.

Figure 6:
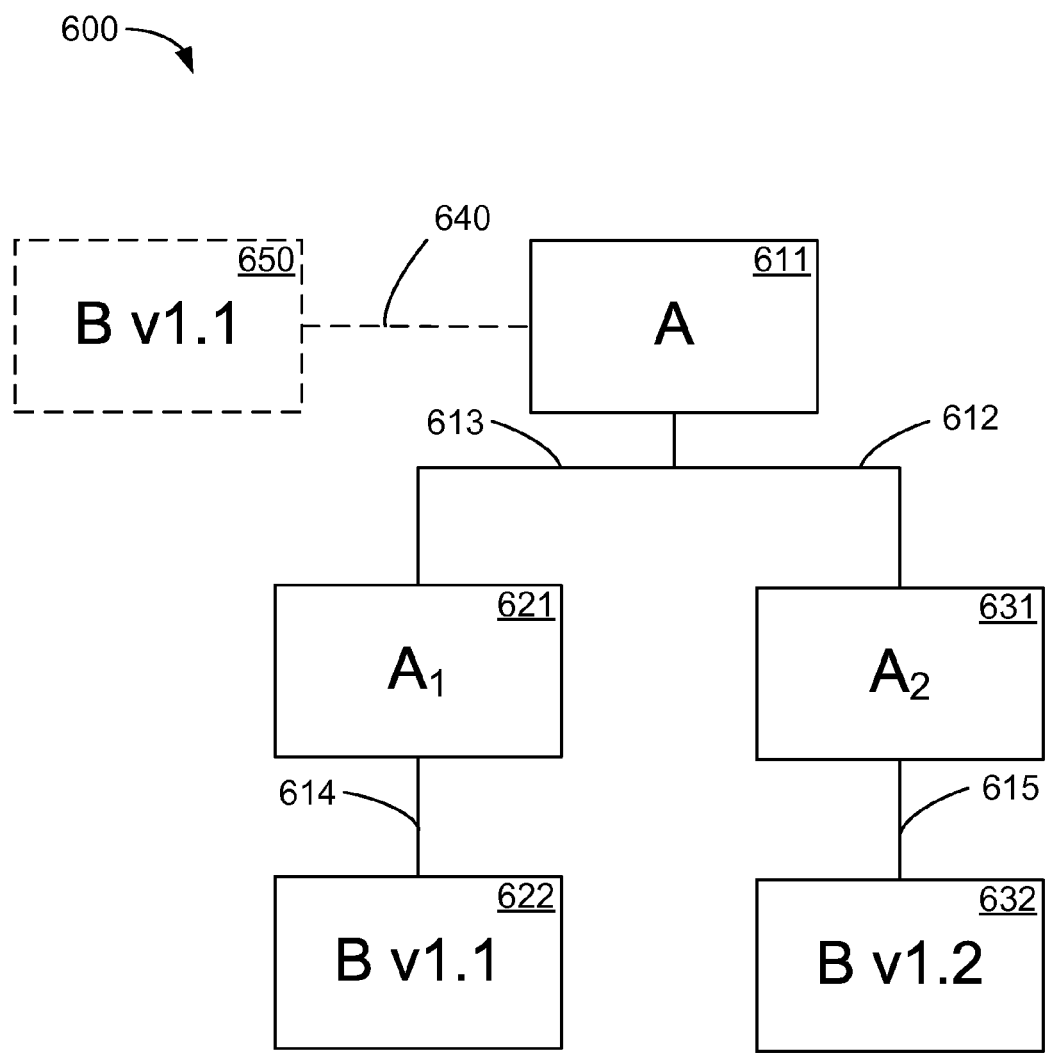

FIG. 6 is a block diagram of another exemplary hierarchy 600 of components of an exemplary product A 611 that includes overriding references. The product A 611 includes a first component $A_1$ 621 and a second component $A_2$ 631. The first component $A_1$ 621 includes one sub-component B v1.1 622, representing a component B having a version 1.1. The second component $A_2$ 631 includes one sub-component B v1.2 632, representing a component B having a version 1.2. The product A 611 has hierarchical associations 612 and 613 with components $A_1$ 621 and $A_2$ 631, respectively. Likewise, the component $A_1$ 621 has a hierarchical association 614 with sub-component B v1.1 622, and the second component $A_2$ 631 has a hierarchical association 615 with the second sub-component B v1.2 632.

In the exemplary embodiment, product A 611 includes a reference 640 to an overriding component B v1.1 650. Overriding reference 640 and overriding component B v1.1 650, in some embodiments, may be similar to reference 540 and component 550 (shown in FIG. 5), respectively. Overriding component B v1.1 650 includes a version 1.1 which, in the example shown in FIG. 6, is the same as component B v1.1 622 (i.e., version 1.1) but different than the version shown for component B v1.2 632 (i.e., version 1.2). In the exemplary embodiment, overriding reference 640 is used for conflict resolution between conflicting components below a given ancestor component, such as component A 611. In other words, overriding reference 640 is used only when two sub-components match but have differing versions (i.e., they are the same component version lineage, similar to branches 210, 220, 230, 240, and 250, but call for different versions). The presence of the overriding reference 640 within a common ancestor of two conflicting sub-components will cause the system to replace either or both of the conflicting sub-components with the overriding component 650.

During operation, a computing system (not shown in FIG. 6) responsible for reading and building hierarchical representations of products and/or components, such as hierarchical representation 600 of product A 611 within a computer-aided drafting system, loads component modules into data structures within a working memory (not shown in FIG. 6) of the system. In some embodiments, some sub-components may be stored in a separate module (e.g., component A 611 may be in one module and refer to a sub-component $A_1$ 621 that is stored in a different module). In other embodiments, some sub-components may be stored within the same module (e.g., component A 611 and sub-component $A_1$ 621 may be stored in the same module). In the exemplary embodiment, each component A 611, $A_1$ 621, $A_2$ 631, B v1.1 622, and B v1.2 632 are stored in separate modules.

In the exemplary embodiment, the system starts by loading, or importing, a module associated with component A 611 (i.e., reading data associated with the structure of component A 611 and building data structures within the memory for that component). The module associated with component A 611 identifies that component A 611 includes two children components, $A_1$ 621 and $A_2$ 631, as well as an overriding reference 640 to overriding component B v1.1 650. The system then identifies that $A_1$ 621 includes a child sub-component B v1.1 622, and that $A_2$ 631 includes a child sub-component B v1.2 632 that are in conflict. The system searches up the ancestor hierarchy for each sub-component B v1.1 622 and B v1.2 632 to locate a shared ancestor (e.g., component A 611) having an overriding reference (e.g., reference 640) for component B (e.g., overriding component B v1.1 650). Upon finding overriding reference 640, the system loads the component B version based on overriding component B v1.1 650 (i.e., version 1.1 of component B) for each child sub-component B. In other words, data structures for component B version 1.1 are loaded as the child sub-components in positions 622 and 632 shown in FIG. 6. Further, in some embodiments, references 614 and 615 are marked as overridden.

The above examples with respect to FIGS. 5 and 6 are described as conducted during a new structure load (i.e., during an initial build of a hierarchy of components within a memory). However, it should be understood that other implementations of overriding references are possible and within the scope of this disclosure. For example, overriding reference analysis may be performed with an already built structure. Components may be added or deleted, and an overriding reference analysis may be performed on the resulting structure to check for new conflicts that may have been introduced. An overriding reference may be added to or removed from an existing structure, and an overriding reference analysis may be performed to discover conflicts and/or replace sub-components. In some embodiments, when components are added or deleted, those components are analyzed for impact on overriding references, and subsequent changes to the hierarchy are made.

In the exemplary embodiments described herein, component preemption is determined based on matching components and comparing differences in versions. In the exemplary embodiments, the preemption identification criteria includes matching between two components based on a component identifier, such as a URL, as well as a version identifier, such as a version number. The version identifier may be viewed, generally, as a particular attribute of a component. The system uses the preemption identification criterion to determine whether or not to preempt the sub-component with the overriding component. If the components have the same component identifier, but different version identifiers, then the system will use the overriding reference instead of the native reference. However, it should be understood that other preemption identification criteria may be used. For example, preemption identification criteria may include other component identifiers, such as a unique index number for each component that shares a module branch such as shown in FIG. 2, or sets of component identifiers. Preemption resolution information may also include other single attributes of components, or combinations of component attributes, or ranges of attributes.

In some embodiments, the preemption identification criteria includes not only a component identifier (e.g., a URL), and a version identifier (e.g., a version number), but also a relative path of a component within a hierarchy. The relative path of a component refers to the component's location within the hierarchy, and may be relative to the ancestor component to which the overriding reference is applied, or to any other relative or absolute path to a component. The inclusion of a relative path within the preemption identification criteria allows another layer of granularity in determining when an overriding reference should replace a sub-component. More specifically, the inclusion of a relative path allows the system to replace a specific sub-component (i.e., the sub-component residing at the particular relative path). As such, if the sub-component matches the URL (i.e., it is the same component) and the path (i.e., it is the specific component at this location), and the version identifier is different, then the system will replace the sub-component with the overriding component. As such, only the specific sub-component at the relative path specified by the overriding reference is replaced, and not necessarily any other progeny of the ancestor having the overriding reference.

In other embodiments, an overriding reference may indicate the removal of components using, for example, an overriding component of "null" (e.g., an overriding component version="null"). As such, the overriding reference may include preemption identification criteria identifying certain components to match, but because of the overriding component version of "null," the matching sub-component will be removed (i.e., replaced with nothing).

Figure 7:
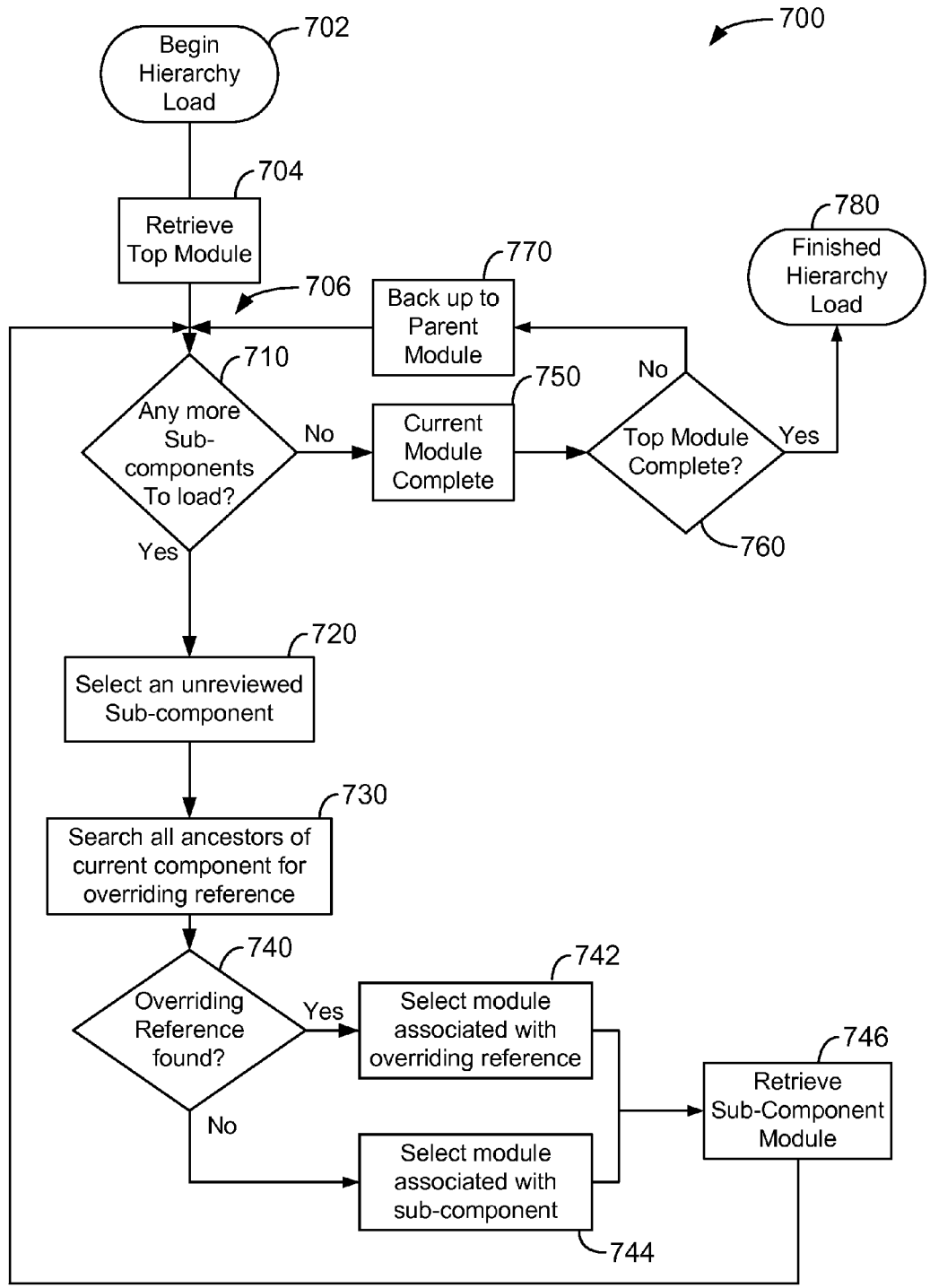

FIG. 7 is a flowchart illustrating an exemplary hierarchy load process 700 for identifying and integrating overriding references. In the exemplary embodiment, process 700 is performed using a computing system, such as hierarchy management system (HMS) 820 (shown in FIG. 8) or computing device 910 (shown in FIG. 9). A design team inputs a request for a version of their module (e.g., a component hierarchy), such as for product A 511 (shown in FIG. 6). HMS 820 begins 702 process 700 by retrieving 704 the module associated with the highest level component that the design team is working. The top level module, and each module subsequently referenced, may include reference to one or more sub-components. Each sub-component may also have an associated module, which may also include reference to one or more sub-components, and so on.

HMS 820 begins with the top module (i.e., the top component), which in the exemplary embodiment represents product A 511. Product A 511 is incorporated into hierarchy 500 (shown in FIG. 5), as represented by element 511 (i.e., data structures for the top-level product are created in memory, including data imported from the top module). In the exemplary embodiment, the top module references components $A_1$ 521 and $A_2$ 531. At step 710, HMS 820 examines whether the current module being processed (i.e., the top module associated with product A 511) has any sub-components that have not yet been processed (i.e., that have not yet been imported into hierarchy 500 (shown in FIG. 5). If there is one or more un-reviewed sub-components remaining, then HMS 820 selects 720 an un-reviewed sub-component for import.

For example, in one embodiment, HMA 820 selects 720 component $A_1$ 521. Prior to fully importing the sub-component $A_1$ 521, HMS 820 analyzes the sub-component for the presence of any overriding references that match. HMS 820 searches for overriding references within hierarchy 500 that refer to an overriding component matching the component $A_1$. In some embodiments, HMS 820 examines one or more ancestors of the descendant component in ascending order through the logical component hierarchy starting with a parent of the descendent component, and identifies the overriding reference upon examining the ancestor component, wherein identifying the overriding reference includes examining the ancestor for a reference associated with a component matching the descendant component. In some embodiments, the first matching overriding reference encountered in an ancestor is used. In other words, the closest ancestor with a matching overriding reference is used. In other embodiments, the highest matching overriding reference encountered in an ancestor is used. In other words, the farthest ancestor with a matching overriding reference is used.

In the exemplary embodiment, HMS 820 searches 730 ancestor of the sub-component for overriding references referring to an overriding component that matches with the particular sub-component being reviewed (i.e., $A_1$). In this example, the only ancestor of $A_1$ currently in hierarchy 500 is its parent, the component A 511. Component A 511 does have a defined overriding reference (i.e., overriding reference 540 (shown in FIG. 5)). However, overriding reference 540 refers to an overriding element 550 that does not match with the current sub-component being analyzed (i.e., overriding reference 540 is to component B, where the sub-component being analyzed is to component $A_1$). If 740 a matching overriding reference is not found, HMS 820 selects 744 the module associated with the sub-component being analyzed (i.e., component $A_1$ v1.0 521) and retrieves 746 and imports that module into hierarchy (e.g., component $A_1$ v1.0 521 is added as a child of A 511, etc.).

In the exemplary embodiment, as a part of retrieving 746 the sub-component module, this sub-component becomes the current module under review. HMS 820 loops up to consider sub-components of component $A_1$ v1.0 521. In this example, component $A_1$ v1.0 521 has one sub-component, B v1.1 522. At step 710, HMS 820 begins analysis of sub-component B v1.1 522, and searches 730 all ancestors of this sub-component. At this stage, hierarchy 500 includes two nodes (i.e., two components), $A_1$ v1.0 521, and A 511, each of which is an ancestor of sub-component B v1.1 522. In the exemplary embodiment, HMS 820 ascends up the tree of ancestors searching for a matching overriding reference. Component $A_1$ v1.0 521 is examined for overriding references, but has none. Component A 511, however, does have an overriding reference 540 (i.e., HMS 820 has identified an overriding reference for the sub-component under review). Further, the overriding component 550 to which overriding reference 540 points does match the current sub-component under review. In other words, overriding component 550 is for a component B, and sub-component B v1.1 522 is also for a component B. As such, HMS 820 determines a requirement to replace the descendent component (i.e., sub-component B v1.1 522) within the logical component hierarchy (i.e., hierarchy 500) with an overriding component (i.e., overriding component 550) that is associated with an ancestor (i.e., product A 511) by an overriding reference (i.e., overriding reference 540). Thus, a matching overriding reference is found 740. Accordingly, HMS 820 selects 742 the module associated with the overriding reference (i.e., component B v1.0) rather than the module associated with the sub-component under review. In other words, HMS 820 replaces the descendent component with the overriding reference within the logical component hierarchy.

In the exemplary embodiment, the overriding component and the descendent component are different versions of a single component. For example, sub-component B v1.1 522 and overriding component B v1.0 550 are different versions of a single component B. HMS 820 may determine to select 742 the overriding component for replacement of the descendent component based on such differing versions. In some embodiments, the descendent component includes a descendent version identifier, the overriding component includes an overriding version identifier, and determining a requirement to replace the descendent component further includes comparing the descendent version identifier with the overriding version identifier. As such, the requirement to replace is determined based on the comparing. In some embodiments, replacing the descendent component includes removing any association between the parent component and the descendent component and attaching the overriding component to the parent component within the logical component hierarchy.

Continuing the example, the module associated with the overriding component (i.e., component B v1.0) is retrieved 746 and becomes attached as a child to component $A_1$ v1.0 521 in hierarchy 500. In other words, an instance of overriding component 550 (i.e., an instance of component B v1.0) is loaded into the place within hierarchy 500 where component B v1.1 522 would have been. This sub-component would then become the current module under investigation at step 710. However, because component B v1.0 522 has no defined children (i.e., no sub-components), HMS 820 then completes 750 the current module. HMS 820 next examines 760 whether the top module has been completed. If not, HMS 820 returns 770 to the parent of the current (i.e., the just completed) component for further analysis. In other words, once each of a component's sub-components are completely reviewed, HMS 820 ascends to the parent of that component at step 770 to continue processing of the parent's other sub-components. HMS 820 is finished 780 when the top module has been completely reviewed at step 760 (i.e., when all of the top module's sub-components have been reviewed).

As such, the overriding reference for component B did not tamper with any component imports for which there was no matching overriding reference (i.e., components A 511, $A_1$ v1.0 521, and $A_2$ v1.0 531). Rather, the overriding reference serves to replace only the component originally specified by $A_1$ v1.0 521 (i.e., component B v1.1) with the component indicated by the overriding reference (i.e., component B v1.0).

In the exemplary embodiment, HMS 820 describes a depth-first approach to examination and construction of hierarchy 500 (i.e., at investigation of each new component, HMS 820 steps down into and fully examines the first sub-component before reviewing the other sub-components). However, it should be understood that any other approach to traversing and building hierarchy 500 that enables operation of the systems and methods described herein such as, for example, a breadth-first approach (i.e., reviewing all components at a level before stepping down into any of the sub-components), may be used. Further, in some embodiments, the logical component hierarchy further includes another descendant component associated with the ancestor component that includes a conflicting version. As such, determining a requirement to replace the descendant component may further include detecting a conflict between the descendant component and the other descendant component.

Figure 8:
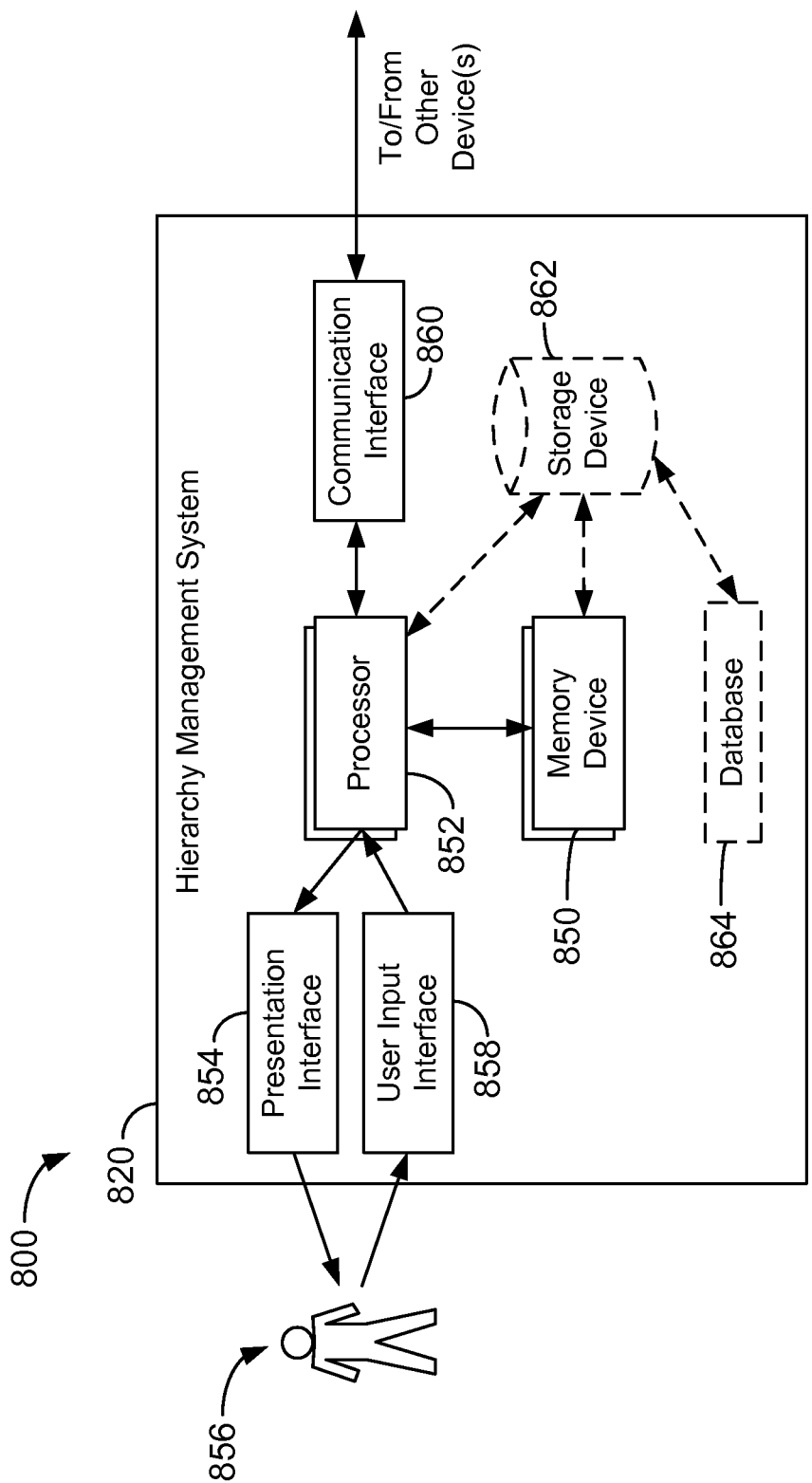

FIG. 8 is a block diagram 800 of an exemplary hierarchy management system 820 used to implement overriding references within component design hierarchies such as hierarchy 500 (shown in FIG. 5) and hierarchy 600 (shown in FIG. 6). Alternatively, any computer architecture that enables operation of hierarchy management system 820 as described herein may be used. In the exemplary embodiment, hierarchy management system 820 facilitates constructing component design hierarchies in data structures within a memory device 850 and enables overriding reference and component replacement as describe by processes 700 in reference to FIG. 7.

In the exemplary embodiment, hierarchy management system 820 includes a memory device 850 and a processor 852 operatively coupled to memory device 850 for executing instructions. In some embodiments, executable instructions are stored in memory device 850. Hierarchy management system 820 is configurable to perform one or more operations described herein by programming processor 852. For example, processor 852 may be programmed by encoding an operation as one or more executable instructions and providing the executable instructions in memory device 850.

Processor 852 may include one or more processing units, e.g., without limitation, in a multi-core configuration.

In the exemplary embodiment, memory device 850 is one or more devices that enable storage and retrieval of information such as executable instructions and/or other data. Memory device 850 may include one or more tangible, non-transitory computer-readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

In the exemplary embodiment, memory device 850 may be configured to store a variety of component and module data associated with various components and sub-components in data structures, files, or other memory areas. Further, memory device 850 may also store component relationship data and hierarchy data such as hierarchies 500 and 600, or other component-related data such as shown in FIGS. 1-4. Further, memory device 850 may also store overriding reference and overriding component data such as shown in FIGS. 5 and 6.

In some embodiments, hierarchy management system 820 includes a presentation interface 854 coupled to processor 852. Presentation interface 854 presents information, such as a user interface and/or an alarm, to a user 856. For example, presentation interface 854 may include a display adapter (not shown) that may be coupled to a display device (not shown), such as a cathode ray tube (CRT), a liquid crystal display (LCD), an organic LED (OLED) display, and/or a hand-held device with a display. In some embodiments, presentation interface 854 includes one or more display devices. In addition, or alternatively, presentation interface 854 may include an audio output device (not shown), e.g., an audio adapter and/or a speaker.

In some embodiments, hierarchy management system 820 includes a user input interface 858. In the exemplary embodiment, user input interface 858 is coupled to processor 852 and receives input from user 856. User input interface 858 may include, for example, a keyboard, a pointing device, a mouse, a stylus, and/or a touch sensitive panel, e.g., a touch pad or a touch screen. A single component, such as a touch screen, may function as both a display device of presentation interface 854 and user input interface 858.

In the exemplary embodiment, a communication interface 860 is coupled to processor 852 and is configured to be coupled in communication with one or more other devices such as, another computing system, or any device capable of accessing hierarchy management system 820 including, without limitation, a portable laptop computer, a personal digital assistant (PDA), and a smart phone. Communication interface 860 may include, without limitation, a wired network adapter, a wireless network adapter, a mobile telecommunications adapter, a serial communication adapter, and/or a parallel communication adapter. Communication interface 860 may receive data from and/or transmit data to one or more remote devices. Hierarchy management system 820 may be web-enabled for remote communications, for example, with a remote desktop computer (not shown).

In the exemplary embodiment, presentation interface 854 and/or communication interface 860 are capable of providing information suitable for use with the methods described herein, e.g., to user 856 or another device. Accordingly, presentation interface 854 and/or communication interface 860 may be referred to as output devices. Similarly, user input interface 858 and/or communication interface 860 are capable of receiving information suitable for use with the methods described herein and may be referred to as input devices.

Further, processor 852 and/or memory device 850 may also be operatively coupled to a storage device 862. Storage device 862 is any computer-operated hardware suitable for storing and/or retrieving data, such as, but not limited to, data associated with a database 164. In the exemplary embodiment, storage device 862 is integrated in hierarchy management system 820. For example, hierarchy management system 820 may include one or more hard disk drives as storage device 862. Moreover, for example, storage device 862 may include multiple storage units such as hard disks and/or solid state disks in a redundant array of inexpensive disks (RAID) configuration. Storage device 862 may include a storage area network (SAN), a network attached storage (NAS) system, and/or cloud-based storage. Alternatively, storage device 862 is external to hierarchy management system 820 and may be accessed by a storage interface (not shown).

Moreover, in the exemplary embodiment, database 864 contains a variety of static and dynamic operational data associated with components, modules, overriding references and overriding components, and hierarchies.

The embodiments illustrated and described herein as well as embodiments not specifically described herein but within the scope of aspects of the disclosure, constitute exemplary means for managing component hierarchies that include overriding references. For example, hierarchy management system 820, and any other similar computer device added thereto or included within, when integrated together, include sufficient computer-readable storage media that is/are programmed with sufficient computer-executable instructions to execute processes and techniques with a processor as described herein. Specifically, hierarchy management system 820 and any other similar computer device added thereto or included within, when integrated together, constitute an exemplary means for managing component hierarchies that include overriding references.

Figure 9:
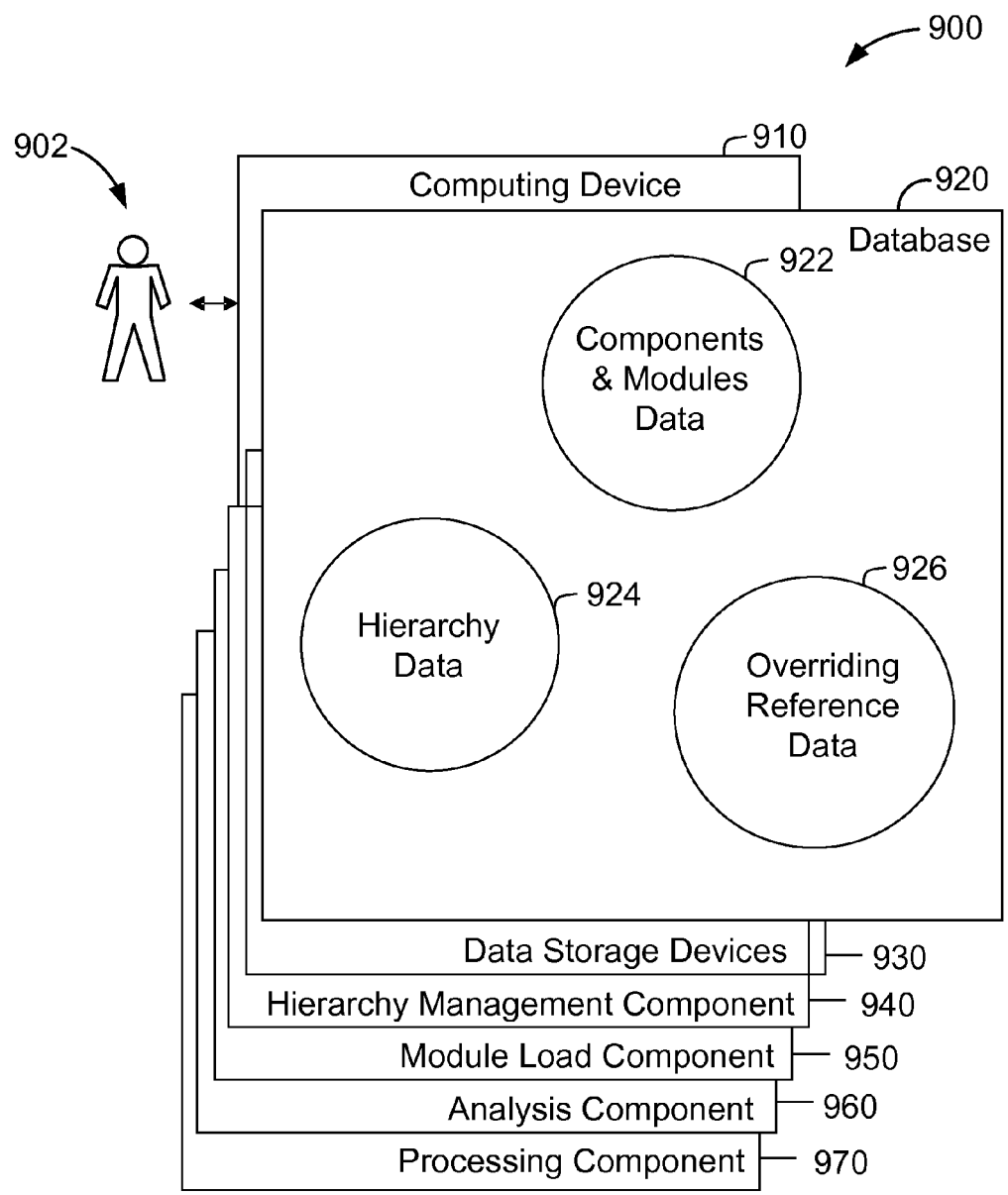

FIG. 9 shows an exemplary configuration 900 of a database 920 within a computing device 910, along with other related computing components, that may be used to manage component hierarchies that include overriding references. In some embodiments, computing device 910 is similar to hierarchy management system 820 (shown in FIG. 8). Database 920 is coupled to several separate components within computing device 910, which perform specific tasks.

In the exemplary embodiment, database 920 includes components & modules data 922, hierarchy data 924, and overriding reference data 926. In some embodiments, database 920 is similar to database 864 (shown in FIG. 8). Components & modules data 922 includes information associated with design components and modules as described above in reference to FIGS. 1-6. Hierarchy data 924 includes hierarchy component data and data defining relationships between components, such as shown in hierarchies 500 and 600 (shown in FIGS. 5 and 6, respectively). Overriding reference data 926 includes data associated with overriding references and overriding components, such as overriding references 540 and 640 (shown in FIGS. 5 and 6, respectively) and overriding components 550 and 650 (shown in FIGS. 5 and 6, respectively).

Computing device 910 includes the database 920, as well as data storage devices 930. Computing device 910 includes a hierarchy management component 940 for importing modules, and building managing hierarchies such as hierarchies 500 and 600. Computing device 910 also includes a module load component 950 for processing modules associated with components of hierarchies. An analysis component 960 is also included for processing aspects of overriding reference processing as described in reference to processes 700 and 800 (shown in FIGS. 7 and 8, respectively). A processing component 970 assists with execution of computer-executable instructions associated with the tokenization system.

As will be appreciated based on the foregoing specification, the above-described embodiments of the disclosure may be implemented using computer programming or engineering techniques including computer software, firmware, hardware or any combination or subset thereof, wherein the technical effect is a system for managing component hierarchies and implementing overriding references and replacement of underlying components with overriding components. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

A technical effect of the systems and methods described herein include at least one of (a) determining, by the computer device, a requirement to replace the descendant component, within the logical component hierarchy, with an overriding component, the overriding component associated with the ancestor component by an overriding reference; (b) replacing the descendant component with the overriding component within the logical component hierarchy; (c) removing any association between the parent component and the descendant component; (d) attaching the overriding component to the parent component within the logical component hierarchy; (e) comparing a descendent version identifier with an overriding version identifier, wherein the requirement to replace is determined based on the comparing; (f) detecting a conflict between the descendant component and the other descendant component; (g) comparing the descendent version identifier with the other version identifier, wherein the requirement to replace is determined based on the comparing; (h) identifying the overriding component to use during replacing; (i) examining one or more ancestors of the descendant component in ascending order through the logical component hierarchy starting with a parent of the descendent component; (j) identifying the overriding reference upon examining the ancestor component, wherein identifying the overriding reference includes examining the ancestor for a reference associated with a component matching the descendant component.

The exemplary methods and systems facilitate replacing sub-components with other components using an overriding reference defined within a component hierarchy. For example, one version of a sub-component may be replaced during a hierarchy load by defining an overriding reference within an ancestor component that links to an overriding component having a different version. During hierarchy build, the systems and methods described herein replace matching sub-components below the overriding reference with the overriding component. As such, conflicting components are standardized (i.e., conflicts are eliminated) by using the overriding component rather than the original sub-component.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A computer-implemented method for managing conflicts in a logical component hierarchy including an ancestor component, a first descendant component associated with the ancestor component, and a first sub-component associated with the first descendant component, the method using a computer device in communication with a memory, the method comprising:
building, within the memory, a hierarchical representation of the logical component hierarchy, the hierarchical representation including the ancestor component, a first descendant reference between the ancestor component and the first descendant component, and a second descendant reference between the first descendant component and the first sub-component associated with the first descendant component;
determining, by the computer device, a requirement to replace an overriding component with an overriding version of the overriding component within the logical component hierarchy, the requirement to replace the overriding component being associated with the ancestor component;
adding the overriding component and an override reference to the hierarchical representation, the overriding component identifying the overriding version of the overriding component, the override reference being between the overriding component and the ancestor component, the overriding reference representing an indication that an occurrence of the overriding component beneath the ancestor component within the hierarchical representation is to be replaced by the overriding version of the overriding component;

detecting the presence of the overriding component as a descendant of the ancestor component within the hierarchical representation and the existence of the override reference associated with the ancestor component, the first sub-component being the overriding component; and replacing the first sub-component with the overriding component within the logical component hierarchy by loading the overriding version of the overriding component into the logical component hierarchy based on the detecting.

2. The method of claim 1, wherein replacing the first sub-component further comprises:
   removing the second descendant reference from the hierarchical representation;
   adding the overriding version of the overriding component within the hierarchical representation; and
   adding a third descendant reference between the first descendant component and the overriding component within the hierarchical representation.

3. The method of claim 1, wherein determining a requirement to replace the first sub-component further comprises comparing a descendant version identifier with an overriding version identifier of the overriding version, wherein the requirement to replace is determined based on the comparing.

4. The method of claim 1, wherein the logical component hierarchy further includes another descendant component associated with the ancestor component, wherein determining a requirement to replace the first sub-component further comprises detecting a conflict between the first descendant component and the other descendant component.

5. The method of claim 1 further comprising defining the overriding reference in the logical component hierarchy, thereby associating the ancestor component with the overriding component.

6. The method of claim 1 further comprising identifying the overriding component to use during the replacing, the identifying further comprising:
   examining one or more ancestors of the first descendant component in ascending order through the logical component hierarchy starting with a parent of the first descendant component for an overriding reference associated with a component matching the first descendant component; and
   identifying the overriding reference upon examining the ancestor component, wherein identifying the overriding reference includes examining the ancestor for a reference associated with a component matching the first descendant component.

7. A computing device for managing conflicts in a logical component hierarchy including an ancestor component, a first descendant component associated with the ancestor component, and a first sub-component associated with the first descendant component, the computer device comprising a processor communicatively coupled to a memory, the computing device is programmed to:
   build, within the memory, a hierarchical representation of the logical component hierarchy, the hierarchical representation including the ancestor component, a first descendant reference between the ancestor component and the first descendant component, a second descendant reference between the ancestor component and the second descendant component, and a second descendant reference between the first descendant component and the first sub-component associated with the first descendant component;

determine a requirement to replace an overriding component with an overriding version of the overriding component within the logical component hierarchy, the requirement to replace the overriding component being associated with the ancestor component;

add the overriding component and an override reference to the hierarchical representation, the overriding component identifying the overriding version of the overriding component, the override reference being between the overriding component and the ancestor component, the overriding reference representing an indication that an occurrence of the overriding component beneath the ancestor component within the hierarchical representation is to be replaced by the overriding version of the overriding component;

detect the presence of the overriding component as a descendant of the ancestor component within the hierarchical representation and the existence of the override reference associated with the ancestor component, the first sub-component being the overriding component; and replace the first sub-component with the overriding component within the logical component hierarchy by loading the overriding version of the overriding component into the logical component hierarchy in a position of the first sub-component based on the detecting.

8. The computing device of claim 7, wherein replacing the first sub-component further includes:
   removing the second descendant reference from the hierarchical representation;
   adding the overriding version of the overriding component within the hierarchical representation; and
   adding a third descendant reference between the first descendant component and the overriding component within the hierarchical representation.

9. The computing device of claim 7, wherein determining a requirement to replace the first sub-component further comprises comparing a descendant version identifier with an overriding version identifier of the overriding version, wherein the requirement to replace is determined based on the comparing.

10. The computing device of claim 7, wherein the logical component hierarchy further includes another descendant component that is a descendant of the ancestor component, wherein determining a requirement to replace the first sub-component further comprises detecting a conflict between the first descendant component and the other descendant component.

11. The computing device of claim 7, wherein said processor is further programmed to define the overriding reference in the logical component hierarchy, thereby associating the ancestor component with the overriding component.

12. The computing device of claim 7, wherein said processor is further programmed to identify the overriding component to use during the replacing, the identifying further comprising:
   examining one or more ancestors of the first descendant component in ascending order through the logical component hierarchy starting with a parent of the first descendant component; and
   identifying the overriding reference upon examining the ancestor component, wherein identifying the overriding reference includes examining the ancestor for a reference associated with a component matching the first descendant component.

13. At least one non-transitory computer-readable storage media having computer-executable instructions embodied thereon, wherein when executed by at least one processor, the computer-executable instructions cause the processor to:
build, within a memory, a hierarchical representation of a logical component hierarchy, the logical component hierarchy including an ancestor component, a first descendant component associated with the ancestor component, and a first sub-component associated with the first descendant component and a second descendant component associated with the ancestor component, the hierarchical representation including the ancestor component, a first descendant reference between the ancestor component and the first descendant component, and a second descendant reference between the first descendant component and the first sub-component associated with the first descendant component;
determine a requirement to replace an overriding component with an overriding version of the overriding component within the logical component hierarchy, the requirement to replace the overriding component being associated with an ancestor component of the first sub-component;
add the overriding component and an override reference to the hierarchical representation, the overriding component identifying the overriding version of the overriding component, the override reference being between the overriding component and the ancestor component, the overriding reference representing an indication that an occurrence of the overriding component beneath the ancestor component within the hierarchical representation is to be replaced by the overriding version of the overriding component;
detect the presence of the overriding component as a descendant of the ancestor component within the hierarchical representation and the existence of the override reference associated with the ancestor component, the first sub-component being the overriding component; and
replace the first sub-component with the overriding component within the logical component hierarchy by loading the overriding version of the overriding component into the logical component hierarchy based on the detecting.

14. The computer-readable storage media of claim 13, wherein the computer-executable instructions further cause the processor to:
remove the second descendant reference from the hierarchical representation;
add the overriding version of the overriding component within the hierarchical representation; and
adding a third descendant reference between the first descendant component and the overriding component within the hierarchical representation.

15. The computer-readable storage media of claim 13, wherein the logical component hierarchy further includes another descendant component that is a descendant of the ancestor component, wherein the computer-executable instructions further cause the processor to determine a requirement to replace the first sub-component further comprises detecting a conflict between the first descendant component and the other descendant component.

16. The computer-readable storage media of claim 13, wherein the computer-executable instructions further cause the processor to define the overriding reference in the logical component hierarchy, thereby associating the ancestor component with the overriding component.

17. The computer-readable storage media of claim 13, wherein the computer-executable instructions further cause the processor to identify the overriding component to use during the replacing, the identifying further including:
examining one or more ancestors of the first descendant component in ascending order through the logical component hierarchy starting with a parent of the first descendant component; and
identifying the overriding reference upon examining the ancestor component, wherein identifying the overriding reference includes examining the ancestor for a reference associated with a component matching the first descendant component.

* * * * *